United States Patent [19]

Lewis et al.

[11] Patent Number: 4,479,136

[45] Date of Patent: Oct. 23, 1984

[54] CLEANING SYSTEM AND METHOD FOR INK JET PRINTER

[75] Inventors: Arthur M. Lewis; Aldo Scudo, both of Ridgefield, Conn.

[73] Assignee: Exxon Research and Engineering Co., Florham Park, N.J.

[21] Appl. No.: 467,422

[22] Filed: Feb. 17, 1983

[51] Int. Cl.[3] .......... G01D 15/16

[52] U.S. Cl. .......... 346/140 R; 15/104.94; 239/106; 346/146

[58] Field of Search .......... 346/140 R, 75, 146; 15/104.93, 104.94, 210 R; 239/104, 106, 114, 115

[56] References Cited

U.S. PATENT DOCUMENTS 4,112,435 9/1978 Kattner .......... 346/140

4,401,990 8/1983 Aiba .......... 346/140 X

FOREIGN PATENT DOCUMENTS 1250761 10/1971 United Kingdom .

1390187 4/1975 United Kingdom .

OTHER PUBLICATIONS

TEXWIPE, pamphlet entitled "Contamination Control for EDP Environments" including descriptions of Printer Preventive Maintenance Kit TX212; and Mag/-stripe Card Reader Cleaning Kit; and Xergraphic copy of each side of a Honeywell Cleaning Badge for Badge Reader, part No. 53601023-53601701, Rev D, with a foam strip being indicated by the cross-hatched area.

*Primary Examiner*—Joseph W. Hartary

*Attorney, Agent, or Firm*—Kenneth Watov

[57] ABSTRACT

Apparatus for cleaning contaminants from the face and orifice(s) of the print head of an ink jet printer includes a cleaning card having a foam strip secured across the front face of the card near its bottom edge, the upper portion of the card forming step-like protrusions from each lateral or side edge of the narrower lower portion of the card, the foam strip being saturated with a cleaning solvent, the lower portion of the card being adapted for insertion between a card guide and the face of said print head, causing squeezing of the foam strip for release of the solvent upon and wiping of the face of the print head and orifice(s) as the foam strip is moved thereagainst.

23 Claims, 7 Drawing Figures

CLEANING SYSTEM AND METHOD FOR INK JET PRINTER

The field of the present invention relates generally to ink jet printers, and more specifically to apparatus and methods for cleaning the face and orifices of an ink jet print head.

In an ink jet printer the face of the print head thereof may in time become contaminated with stray droplets of ink, paper dust, and other extraneous and undesireable material, all of which if allowed to accumulate would interfere with reliable operation of the print head. A number of different devices and systems have been developed for cleaning or protecting the face of the print head of an ink jet printer from the deleterious effects of various contaminants. Kattner U.S. Pat. No. 4,112,435, issued on Sept. 5, 1978, for "Protective and Cleaning Device for Writing Heads in Ink Recorder Devices", teaches a protective and cleaning combination shield and wiper for ink jet recording device writing heads, consisting of a shield member mounted on the writing head and movable between a blocking position in front of the orifices of the writing head, and an operating or non-blocking position clear of the orifices. The shield is equipped with a resilient wiping arm which wipes across the face of the writing head during movement between the positions.

Another example of a prior ink jet printer head tending system shown in Hoffmann et al U.S. Pat. No. 4,210,918, includes a collecting apparatus provided with a knife edge for collecting and discharging droplets of a specific charge, and a recording support arranged downstream of the movable knife edge wherein the collecting apparatus is provided with a cleaning device and an extraction device which are such that a new or freshly clean part of a knife edge always faces droplets being separated in the subject continuous ink jet printer system. A third example of a head tending system shown in Krull U.S. Pat. No. 4,228,442, for "Means for Preventing Drying of Ink at Nozzles of Print Heads", includes the mounting of an absorbent material with one end in an ink chamber, and the other end positioned in the proximity of the nozzle or nozzles of the print head for carrying fluid or vapor therearound to form a moist or humid atmosphere at the nozzle or nozzles, thereby preventing drying of the ink.

The present inventor observed that in laboratory conditions, experienced technicians often clean the face and orifices of an ink jet print head by wiping or scrubbing the face with a solvent saturated lint-free cloth. He noted that although this head cleaning approach is rather straight forward, much judgement and experience is required for the operator to properly clean the head in this manner. Also, the cleaning operator must handle the solvent-wetted material directly, and the face of the print head must be directly accessable to the operator. In practical applications, the print head is not directly accessable to an operator, and the typical operator lacks the experience and judgement necessary to properly clean the print head as previously described.

The present invention overcomes the problems in the prior art by providing a cleaning card having a foam strip saturated with a cleaning solvent, whereby the portion of the card with the foam strip is insertable between a card guide and the face of the ink jet print head for causing the card guide to squeeze the foam to release the cleaning solvent upon the head as the card is being inserted, thereby permitting the face of the print head to be scrubbed and cleaned via the rubbing or wiping action of the foam and cleansing properties of the solvent. The card guide is designed to further coact with the cleaning card by providing stops for limiting the depth of insertion of the cleaning card, while providing for compression of the foam strip against the face. The card guide is also designed to provide a narrow tapered gap between the inside face of the card guide and the face of the print head below the orifices and just beyond the depth of penetration of an inserted cleaning card, for trapping cleaning solvent flowing down the face of the print head upon insertion of the cleaning card, whereby the trapped solvent is carried away from the print head by a wick material having one end mounted in the narrowest portion of the gap between the card guide and print head.

In the drawings, wherein similar items are identified by identical reference designations:

Figure 1:
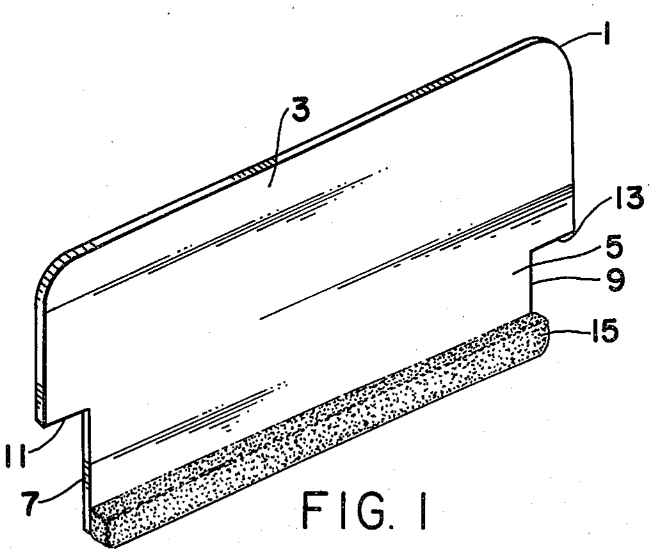
FIG. 1 is a left-elevational pictorial view of the cleaning card of the preferred embodiment of the invention.
Figure 2:
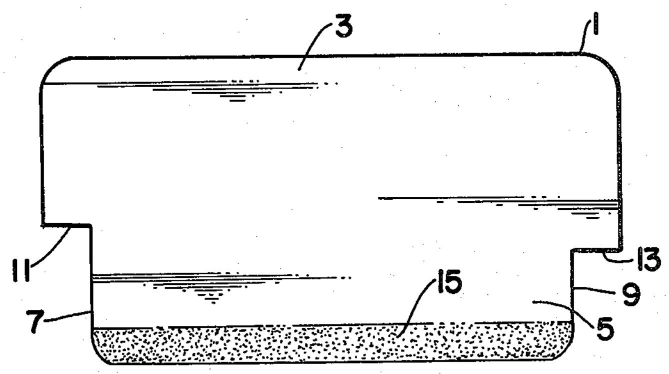
FIG. 2 is a front-plan view of the cleaning card for the preferred embodiment of the invention.
Figure 3:
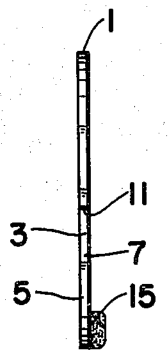
FIG. 3 is a left-side plan view of the cleaning card of the preferred embodiment of the invention.
Figure 4:
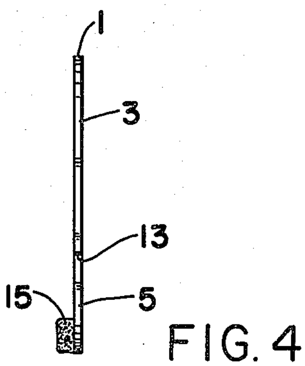
FIG. 4 is a right-side plane view of the cleaning card of the preferred embodiment of the invention.

With reference to FIG. 1, the cleaning card 1 has an elongated top portion 3, and a lower central portion 5 that is stepped down or narrower than the former. The card can be fabricated from any suitable material, such as plastic, for example. The lateral edges 7 and 9 of the lower portion 5 terminate at step-like projections 11 and 13, respectively of the upper portion 3. A foam-like strip 15 is secured to the lowermost face of the bottom portion 5 (typically by ultrasonic bonding or with a suitable adhesive by thermal bonding), with the bottom edge of the foam-strip 15 being aligned with the bottom edge of the lower portion 5. Polyurethane open-cell foam is a typical material for strip 15. Further reference is made to FIG. 2 showing a front view of the card 1, FIG. 3 showing a left-side plan view thereof, and FIG. 4 showing a right-side plan view thereof. Note that in this example the depth of the steps formed by projections 11 and 13 with the lower portion of the card 5 have different heights or depths from the bottom or lower edge of the lower portion 5. In this manner, the card 1 when inserted into the card guide 17 shown in FIG. 5 will seat at an angle when step 11 is "stopped" via tab 19, and step 13 is "stopped" via tab 21. In this manner, the foam-strip 15 can be made to wipe across orifices (not shown) linearly arranged on a slant with the horizontal on the face 25 of the print head 23, so long as the card 1 is inserted to the "stopped position". The depth of the steps 11 and 13 can be adjusted for making the card "stop" at any desired angle, or at a position where the length of the foam strip 15 is horizontal, depending upon the particular application. The interaction between the card 1, card guide 17, and print head 23 will be discussed in further detail in the following paragraphs.

Figure 5:
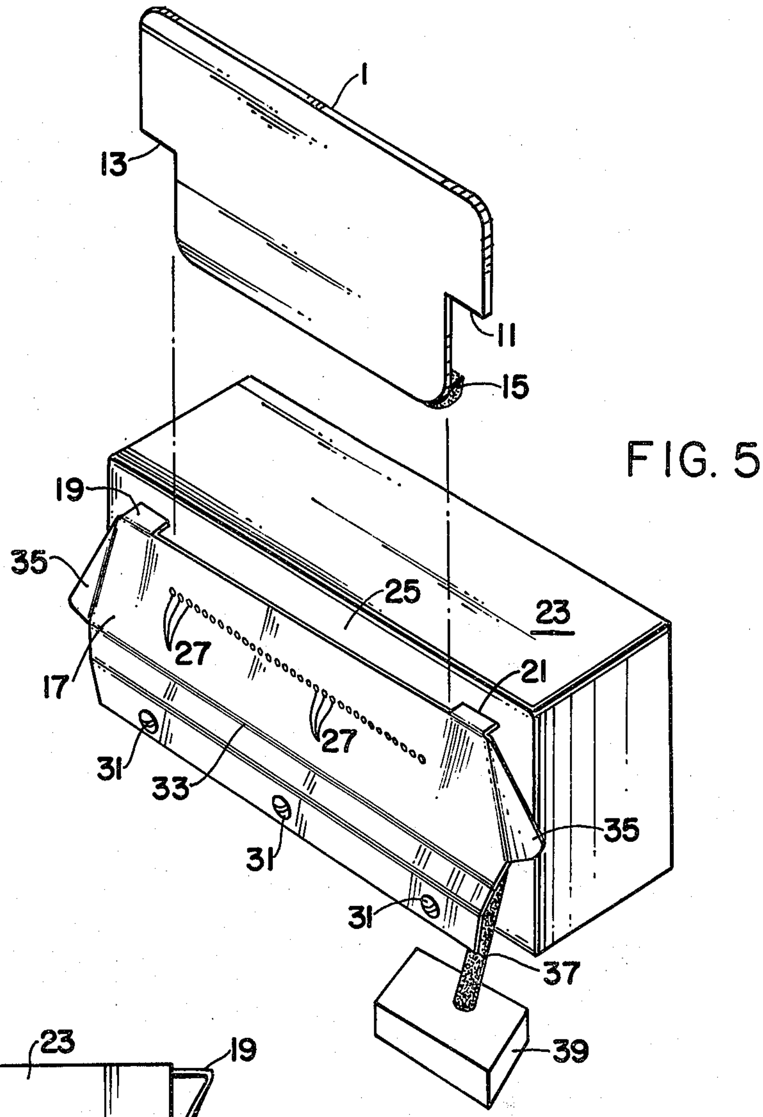
FIG. 5 is an elevational perspective view from the right of an ink jet print head assembly including the card guide, cleaning card, and wick of one embodiment of the present invention.
Figure 6:
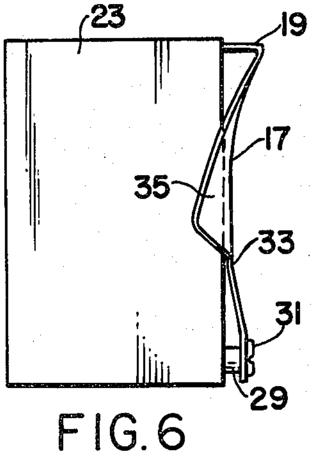
FIG. 6 is a left-side view of the assembly of FIG. 5.
Figure 7:
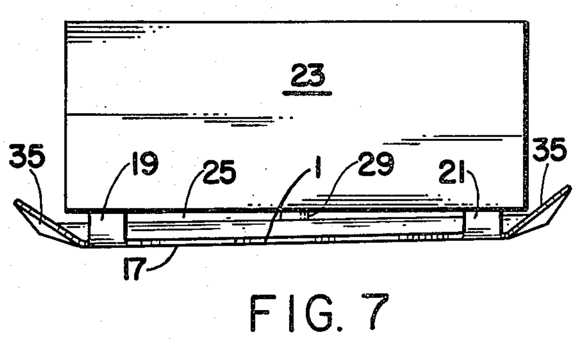
FIG. 7 is top view of the assembly of FIG. 5.

In FIG. 5, the card guide 17 of the present example, includes a plurality of holes 27 linearly arranged on a slant as shown. Each hole 27 is associated with an ink jet orifice located immediately behind the hole on the face 25 of the ink jet print head 23. The purpose of the holes 27 is to permit the associated ink jets to be operated for ejecting from their respective orifices droplets of ink that travel through their associated hole 27 onto a print medium (not shown) located in front of card guide 17. The card guide 17 can be made of any suitable material, a typical material being stainless steel sheeting or a plastic material, wherein the sheet material should have spring like characteristics. With further reference to FIGS. 6 and 7, the card guide 17 is mounted on the print head 23 via spacers 29 and screws 31. The spacer 29 at the right side of the print head is shorter than the spacer 29 used at the left side of the print head, with the spacer 29 in the center of the print head being intermediate in length between the spacers at the right and left, causing the card guide 17 to have its longitudinal axis mounted at an angle with the face 25 of print head 23 (see FIG. 7). Because of this nonparallel mounting of the card guide 17 to the print head 23, the region of narrowest gap or closest contact of the portion of the card guide 17 above the mounting screws 31 and spacers 29 occurs near the right side of print head 23, in this example. Also, card guide 17 generally has a region of closer contact with the face 25 along the bend lines 33, with the closest contact being to the right, as previously described. The basic design of the card guide 17 satisfies all of the usual functions of a typical card guide used in a printer system. For example, the curved upper portion of card guide 17 facilitates printing near the upper free edges of a sheet of paper or print medium prior to the edge being held to a platen by bail rollers (not shown). The wings 35 on each side of the card guide 17 prevent the edges of such a free standing sheet of paper or print medium from jamming into the sides of the print head 23, thereby protecting the face 25 from damage. The card guide 17, in serving the aforementioned functions, limits operator access to the face 25 of print head 23, generally making cleaning difficult. The cleaning card 1 and card guide 17 were designed to substantially alleviate the print head 23 cleaning and access problem.

The curvature and degree of bending from the vertical of the card guide 17 is such that when the cleaning card 1 is inserted into the space between the card guide 17 and face 25 of print head 23, as shown in FIG. 5, a pre-determined squeezing force is applied by the card guide 17 to the foam strip 15 of cleaning card 1. When the foam strip 15 has been saturated with an appropriate cleaning solvent, such as ethyl alcohol, isopropanol, or some other suitable solvent depending upon the particular application. The solvent used partly depends on the composition of the printing ink being run through the printing head 23.

In operation of the present invention, the cleaning card 1 is stored either with a dry foam strip 15, or with the foam strip 15 saturated with an appropriate cleaning solvent, within a sealed package, such as a plastic or metal foil envelope, for example. If the cleaning card is shipped with the foam strip 15 previously saturated with cleaning solvent, the card is ready for use when removed from the envelope. Otherwise, when removed from its storage envelope or pouch, the cleaning card 1 must have the foam strip 15 saturated with the cleaning solvent prior to use. With reference to FIG. 5, the cleaning card 1 is inserted as shown with the foam strip 15 facing the face 25 of the print head 23. As the cleaning card 1 is inserted between the card guide 17 and face 25 of print head 23, the curvature of the card guide 17 is such that prior to the foam strip wiping over the orifices on the face 25, a compressive force or squeezing force is applied to the foam strip 15, causing it to release cleaning solvent onto the face 25, followed by the foam strip 15 wiping across the orifices. Full insertion of the cleaning card 1 is obtained when the steps 11 and 13 of card 1 seat against tabs 19 and 21, respectively, of card guide 17, thereby preventing further insertion thereof. Also, as previously described, the height of the steps 11 and 13 from the bottom edge of the cleaning card 1 determine the angle that the foam strip 15 will attain at the extreme of the insertion of the cleaning card 1. The depth of insertion of the cleaning card 1 is made sufficiently deep to insure that the foam strip 15 wipes all of the orifices on the face 25 of the print head 23.

The thickness and width of the foam strip 15 is predetermined to insure that in combination with the compressive force applied by the card guide 17 to the cleaning card 1, excessive cleaning solvent is not applied to the face 25. As the cleaning card 1 is inserted and wiped across the face 25 of print head 23, cleaning solvent released from the foam strip 15 runs down the face 25 and is trapped between that face, and the inside face of the card guide 17 along the bend line 33. Because of the previously described longitudinal tapering of the space between the card guide 17 and face 25, the solvent is made to move by capillary action to the right side of the face 25, where it is collected by a wick material 37 securely mounted between the card guide 17 and the face 25, as shown. The wick material 37 drains off the cleaning solvent to an open area where the solvent can evaporate from the wick 37, or be dripped into a suitable container 39. Accordingly, in this manner, when the cleaning card 1 is inserted between the card guide 17 and the print head 23, the cleaning solvent flooding down the face is controlled and prevented from dripping off the bottom of the print head face 25, while the foam 15 gently scrubs or wipes the area around the orifices as the cleaning card 1 is inserted downward to its maximum depth.

In the preferred embodiment of the invention, for convenience, it is preferred that the cleaning card be supplied in a pouch with the foam 15 pre-wetted with an appropriate cleaning solvent, as previously mentioned. Alternatively, the cleaning card 1 may be supplied dry in a sealed pouch for maintaining cleanliness thereof, and a small dispensing bottle of cleaning solvent supplied to an operator or service man for wetting the foam 15 after the cleaning card 1 is removed from the storage pouch area. Even when the ultimate user applies the cleaning solvent to the foam 15, the predetermined volume of foam used on the cleaning card 1, along with the dimentional characteristics of the foam strip 15, will control the amount of solvent that is ultimately applied to the face 25 of print head 23, as previously described.

Although specific embodiments of the present invention have been shown and described herein, they are not meant to be limiting, and other embodiments or variations thereof may occur to those skilled in the art, which variations are still within the spirit and scope of the present invention.

What is claimed is:

1. In an ink jet printer including a print head having at least one orifice upon its face, apparatus for cleaning contaminants from the face of said print head and from said orifice(s), comprises:

card guide means non-abuttably mounted upon the face of said print head; and cleaning card means including cleaning solvent carrier means, said cleaning card means being adapted for permitting insertion thereof between the face of said print head and said card guide means, whereby said solvent carrier means wipes the face and said orifice(s) of said print head.

2. The print head cleaning apparatus of claim 1, further including:

a liquid cleaning solvent saturating said cleaning solvent carrier means; and said card guide means further including liquid trapping means for preventing said cleaning solvent from flowing from said carrier means to the bottom edge of said print head.

3. The print head cleaning apparatus of claim 2, further including:

means for carrying or guiding solvent trapped by said trapping means away from said print head.

4. The print head cleaning apparatus of claim 3, wherein said solvent guiding means consists of wick-like material mounted between said print head and said card guide means, a portion of said wick-like material extending from said print head to a "safe region" where the cleaning solvent can either evaporate or be deposited.

5. The print head cleaning apparatus of claim 1, wherein said card guide means is shaped for squeezing said cleaning solvent carrier means during insertion of said cleaning card means between said print head and said card guide means, thereby both causing release of said cleaning solvent from said solvent carrier means, and ensuring a "wiping action" between the latter, the face of said print head, and said orifice(s).

6. The print head cleaning apparatus of claim 1, wherein said card guide means further includes tab-like means protruding from a top edge thereof towards the face of said print head, and said cleaning card means further includes step-like means projecting from right-hand and left-hand lateral edges thereof, positioned for engaging said tab-like means of said card guide means for limiting the depth of insertion of said cleaning card means.

7. The print head cleaning apparatus of claim 1, further including limit means for limiting the extent that said cleaning card means can be inserted between said card guide means and the face of said print head.

8. The print head cleaning apparatus of claim 7, wherein said limit means includes:

tab-like means protruding from a top edge of said card guide means for providing "stops"; and step-like means projecting from the lateral edges of said cleaning card means, positioned for engaging said tab-like means of said card guide after said cleaning solvent carrier means moves below said orifice(s), for determining the maximum depth of insertion of said cleaning card between said card guide and print head.

9. The print head cleaning apparatus of claim 1, wherein said cleaning solvent carrier means includes a strip of foam-like material rigidly secured across a length of said cleaning card means.

10. The print head cleaning apparatus of claim 9, wherein said foam-like material consists of polyurethane open-cell foam.

11. The print head cleaning apparatus of claims 1, or 9, or 10, further including an alcohol based cleaning solvent either soaked or sprayed onto said cleaning solvent carrier means.

12. The print head cleaning apparatus of claim 1, wherein said cleaning card means includes:

a relatively thin card of rigid material having an elongated top portion and a lower central portion stepped-down or narrower than the top portion.

13. The print head cleaning apparatus of claim 12, wherein said cleaning solvent carrier means includes a strip of foam-like material rigidly secured across the face of and juxtaposed to the bottom edge of the central portion of said relatively thin card, said foam-like material being open-celled and compressible.

14. The print head cleaning apparatus of claims 9, 10, or 13, wherein said foam-like material is bonded to said cleaning card means, the latter consisting of a plastic material.

15. The print head cleaning apparatus of claims 6 or 8, wherein the heights of said step-like means from the bottom edge of said cleaning card means are predetermined relative to one another for determining the angle of said cleaning card relative to the horizontal plane of said print head, upon said cleaning card means reaching its maximum depth of insertion.

16. The print head cleaning apparatus of claims 9 or 13, further including predetermining the volume of said strip of foam-like material, for limiting the amount of cleaning solvent released upon the face of said print head, during insertion of said cleaning card means.

17. In an ink jet printer including a print head having at least one orifice upon its face, and head cleaning apparatus for cleaning contaminants from both the face of said print head and said orifice(s), said head cleaning apparatus including card guide means non-abbuttably mounted upon the face of said print head, cleaning card means, and cleaning solvent carrier means, the method comprising the steps of:

forming said cleaning solvent carrier means as a strip;

bonding said strip of cleaning solvent carrier means to a lower portion of a face of said cleaning card means; and shaping said card guide means and said cleaning card means for permitting insertion of said cleaning card means between the face of said print head and said card guide means, whereby said solvent carrier means wipes the face and said orifice(s) of said print head.

18. The method of claim 17, further including the step of:

dimensioning said strip of cleaning solvent carrier means to have a volume predetermined for controlling the amount of a cleaning solvent carried by said solvent carrier means for release upon the face of said print head.

19. The print head cleaning apparatus of claim 18, further including the method comprising the step of:

shaping said card guide means for applying a compressive force upon said cleaning solvent carrier means, for partly controlling both the area of release of cleaning solvent upon the face of said print head, and the wiping force applied upon the face by said cleaning solvent carrier means upon the insertion of said cleaning card means.

20. The method of claim 19, further including the step of shaping said card guide means and said cleaning card means for limiting the depth of insertion of said cleaning card means.

21. The method of claim 20, further including the step of:

shaping said card guide means for intercepting cleaning solvent running down the face of said print head before the solvent can drop from the bottom of the face.

22. The method of claim 21, further including the step of:

shaping said card guide means for moving by capillary action the intercepted cleaning solvent to one side of the face of said print head.

23. The method of claim 22, further including the step of:

wicking away from said print head the cleaning solvent trapped and moved to one side of the face of said print head.

* * * * *